US012556065B2

(12) United States Patent
Zhang et al.

(10) Patent No.: US 12,556,065 B2
(45) Date of Patent: Feb. 17, 2026

(54) OIL COOLING SYSTEM FOR ELECTRIC MACHINE, ELECTRIC DRIVE ASSEMBLY SYSTEM AND VEHICLE

(71) Applicant: Valeo eAutomotive Germany GmbH, Erlangen (DE)

(72) Inventors: Shu Zhang, Erlangen (DE); Wenhui Wang, Erlangen (DE); Yejin Jin, Erlangen (DE); Wanchao Zhao, Erlangen (DE); Yawei Sun, Erlangen (DE)

(73) Assignee: Valeo eAutomotive Germany GmbH, Erlangen (DE)

( * ) Notice: Subject to any disclaimer, the term of this patent is extended or adjusted under 35 U.S.C. 154(b) by 202 days.

(21) Appl. No.: 18/456,106

(22) Filed: Aug. 25, 2023

(65) Prior Publication Data

US 2024/0072612 A1 Feb. 29, 2024

(30) Foreign Application Priority Data

Aug. 25, 2022 (CN) .......................... 202211025193.7

(51) Int. Cl.
*H02K 9/193* (2006.01)
*H02K 9/197* (2006.01)
*H02K 5/20* (2006.01)

(52) U.S. Cl.
CPC ............. *H02K 9/193* (2013.01); *H02K 9/197* (2013.01); *H02K 5/203* (2021.01)

(58) Field of Classification Search
CPC ........... H02K 9/19; H02K 9/193; H02K 9/197
See application file for complete search history.

(56) References Cited

U.S. PATENT DOCUMENTS

2012/0080964 A1* 4/2012 Bradfield ................. H02K 1/20
310/58
2019/0001826 A1* 1/2019 Suzuki ..................... B60L 50/16
(Continued)

FOREIGN PATENT DOCUMENTS

CN 204858766 U 12/2015
CN 106411050 A 2/2017
(Continued)

OTHER PUBLICATIONS

Di (CN114825774 A) English Translation (Year: 2022).*
Extended European Search Report issued on Jan. 29, 2024 in European Application No. 23188714.2, 6 pages.

*Primary Examiner* — Tulsidas C Patel
*Assistant Examiner* — Robert E Mates
(74) *Attorney, Agent, or Firm* — Oblon, McClelland, Maier & Neustadt, L.L.P.

(57) ABSTRACT

An oil cooling system for an electric machine that includes a housing and a stator accommodated in the housing, the stator having a first end part and a second end part in an axial direction of the electric machine. The oil cooling system includes an oil inlet, for receiving external cooling oil; a first annular oil application pipe, located at the first end part and in fluid communication with the oil inlet; and a second annular oil application pipe, located at the second end part and in fluid communication with the oil inlet. An axial oil application part is located between the first end part and the second end part and formed by a housing inner wall and a stator outer wall. The axial oil application part receives cooling oil from at least one of the first annular oil application pipe and the second annular oil application pipe.

20 Claims, 8 Drawing Sheets

(56) References Cited

U.S. PATENT DOCUMENTS

| | | | |
|---|---|---|---|
| 2019/0273420 A1* | 9/2019 | Yasuda | H02K 1/20 |
| 2023/0116766 A1* | 4/2023 | Pu | H02K 1/32 |
| | | | 310/54 |

FOREIGN PATENT DOCUMENTS

| | | | | |
|---|---|---|---|---|
| CN | 111756163 A | | 10/2020 | |
| CN | 113422473 A | | 9/2021 | |
| CN | 11 4069969 A | | 2/2022 | |
| CN | 114825774 A | * | 7/2022 | |
| EP | 3 944 463 A1 | | 1/2022 | |
| JP | 2021-19453 A | | 2/2021 | |
| WO | WO-2022028382 A1 | * | 2/2022 | H02K 1/20 |

* cited by examiner

OIL COOLING SYSTEM FOR ELECTRIC MACHINE, ELECTRIC DRIVE ASSEMBLY SYSTEM AND VEHICLE

TECHNICAL FIELD

The present disclosure relates to the field of electric machine cooling. More specifically, it relates to an oil cooling system for an electric machine, an electric drive assembly system and a vehicle.

BACKGROUND

With the widespread use of electric machines in civil and commercial fields, electric machine cooling is facing stricter requirements.

Existing oil cooling systems generally comprise two straight cooling pipes arranged in parallel, or two annular cooling pipes and an axial connecting pipe arranged axially between the two annular cooling pipes to connect the two annular cooling pipes, for the purpose of cooling the electric machine stator. However, on the one hand, when straight cooling pipes arranged in parallel are used, cooling of the stator windings on the two ends of the stator is not possible, and the configuration of the parallel straight cooling pipes increases the manufacturing cost; on the other hand, when annular cooling pipes and an axial connecting pipe are used, the cooling pipe layout makes installation of the cooling system on the electric machine difficult, and can only be adapted to electric machines of a specific axial size, being unable to be effectively adapted to electric machines of different axial sizes, so has poor portability and scalability.

Thus, there is a need for an oil cooling system that is able to directly cool a stator winding while effectively cooling an electric machine stator, that can be fitted to an electric machine in a simple and convenient way, and that can be flexibly adapted to electric machines of different dimensions, as well as having a low manufacturing cost.

SUMMARY

In response to the above problems, the present disclosure provides an oil cooling system for an electric machine, an electric drive assembly system and a vehicle. Using the oil cooling system for an electric machine provided in the present disclosure, it is possible to achieve effective cooling of an electric machine stator, and also possible to cool a stator wire bundle directly. In addition, the oil cooling system for example can be mounted to an electric machine in a simple and convenient manner, and can be flexibly adapted to electric machines of different dimensions.

According to one aspect of the present disclosure, an oil cooling system for an electric machine is proposed, the electric machine comprising a housing and a stator accommodated in the housing, the stator having a first end part and a second end part in an axial direction of the electric machine, the oil cooling system comprising: an oil inlet, for receiving external cooling oil; a first annular oil application pipe, located at the first end part and in fluid communication with the oil inlet; a second annular oil application pipe, located at the second end part and in fluid communication with the oil inlet; an axial oil application part, located between the first end part and the second end part and formed by a housing inner wall and a stator outer wall, the axial oil application part receiving cooling oil from at least one of the first annular oil application pipe and the second annular oil application pipe.

In some embodiments, the first annular oil application pipe and the second annular oil application pipe are separate components.

In some embodiments, the first annular oil application pipe is in fluid communication with the oil inlet via a first connecting pipeline formed by the housing inner wall; and the second annular oil application pipe is in fluid communication with the oil inlet via a second connecting pipeline formed by the housing inner wall.

In some embodiments, the first annular oil application pipe and the second annular oil application pipe are both provided with an oil application hole.

In some embodiments, the oil application holes apply cooling oil to stator wire bundles at the first end part and the second end part.

In some embodiments, at least one of the first annular oil application pipe and the second annular oil application pipe has an opening for spraying oil towards the axial oil application part.

In some embodiments, at least one cooling channel is further formed between the housing inner wall and the stator outer wall, the at least one cooling channel being in fluid communication with the axial oil application part.

In some embodiments, the at least one cooling channel is a groove formed on the housing inner wall in a circumferential direction.

In some embodiments, the axial oil application part is disposed at an upper part of the at least one cooling channel in the direction of gravity.

In some embodiments, the oil cooling system further comprises an oil collection groove for collecting cooling oil, the oil collection groove having an oil outlet.

In some embodiments, at least one of the first annular oil application pipe and the second annular oil application pipe has at least one axially extending section, and the opening is provided on the axially extending section.

In some embodiments, an oil baffle is provided at least at the first end part.

In some embodiments, the oil baffle comprises: a metal framework; and an elastic covering part.

According to another aspect of the present disclosure, an electric drive assembly system is further proposed, characterized by comprising the oil cooling system for an electric machine as described above.

According to another aspect of the present disclosure, a vehicle is further proposed, characterized by comprising the electric drive assembly system as described above.

BRIEF DESCRIPTION OF THE DRAWINGS

In order to describe the technical solution of embodiments of the present disclosure more clearly, the drawings to be used in describing the embodiments are briefly described below. Obviously, the drawings described below show only some embodiments of the present disclosure, and those skilled in the art may obtain other drawings based on these drawings without inventive effort. The drawings below have not been drawn meticulously in proportion according to actual dimensions, but focus on showing the substance of the present disclosure.

DESCRIPTION OF THE EMBODIMENTS

The technical solution in embodiments of the present disclosure will be described clearly and completely below with reference to the drawings. Obviously, the embodiments described are merely some, not all, of the embodiments of the present disclosure. All other embodiments obtained by those skilled in the art based on embodiments of the present disclosure without inventive effort shall also fall within the scope of protection of the present disclosure.

As indicated in the present disclosure and claims, unless expressly specified otherwise in the context, words such as "a", "one", "one type", and/or "said" do not specifically mean the singular, but may also include the plural. Generally, the terms "comprise" and "include" only indicate the inclusion of expressly identified steps and elements, but these steps and elements do not constitute an exclusive list, and a method or device may also include other steps or elements.

Figure 1:
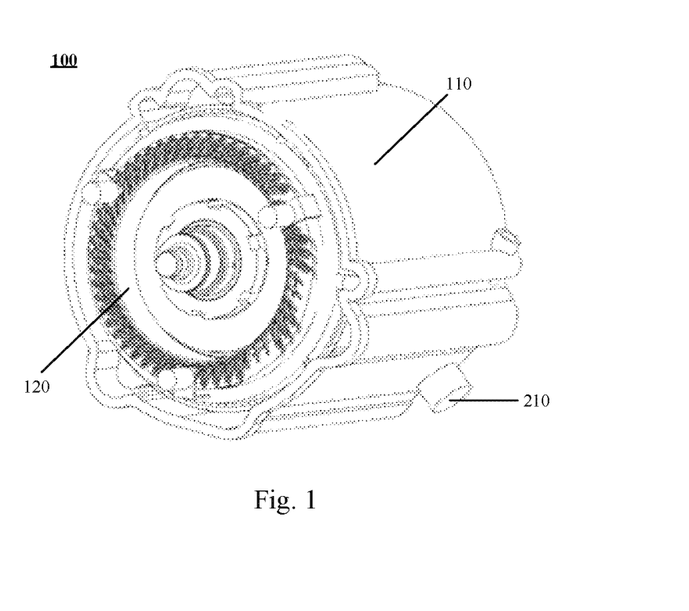
FIG. 1 shows an exemplary block diagram of an electric machine 100 according to embodiments of the present disclosure.
Figure 2:
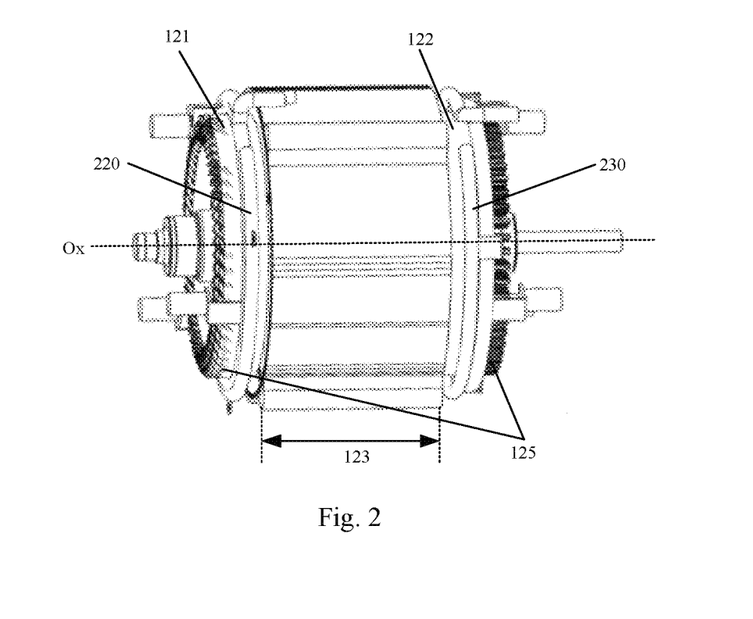
FIG. 2 shows a front view of the electric machine 100 according to embodiments of the present disclosure, with the housing removed.
Figure 3:
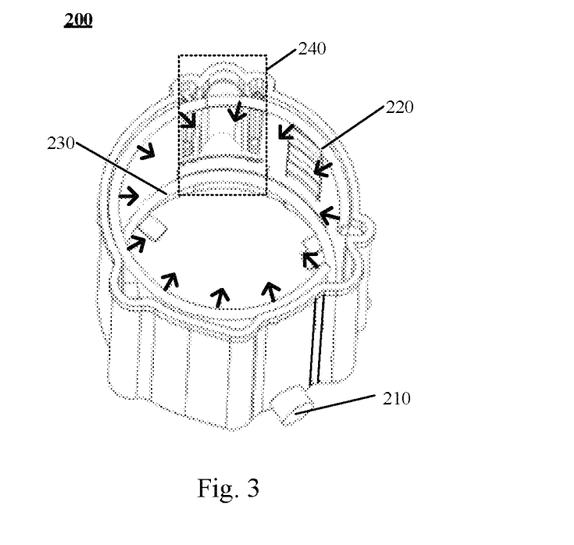
FIG. 3 shows a schematic drawing of an oil cooling system 200 disposed on the electric machine 100, wherein the electric machine stator is not shown, and an axial oil application part 240 is shown by dotted lines.

The present disclosure proposes an oil cooling system. FIG. 1 shows an exemplary block diagram of an electric machine 100 according to embodiments of the present disclosure; FIG. 2 shows a front view of the electric machine 100 according to embodiments of the present disclosure; FIG. 3 shows a schematic drawing of an oil cooling system 200 disposed on the electric machine 100, wherein the electric machine stator is not shown, and an axial oil application part 240 is shown by dotted lines.

Referring to FIGS. 1 and 2, the electric machine 100 for example comprises a housing 110, and a stator 120 accommodated in the housing. The stator 120 has a first end part 121 and a second end part 122 in the direction of an electric machine axis Ox (also called the axial direction hereinbelow).

The direction of the electric machine axis Ox is the direction of a rotation axis of the electric machine.

The terms "first end part" and "second end part" are intended to distinguish between different end parts disposed at two ends of the stator along the rotation axis of the electric machine, rather than define these end parts.

It should be understood that the interior of the electric machine may for example further comprise an electric machine rotor, disposed inside the stator and rotating about the axis of the electric machine.

For example, the electric machine stator has stator wire bundles 125 at the first end part and the second end part. It should be understood that the stator wire bundles 125 are formed of stator windings wound on the electric machine stator.

Furthermore, referring to FIGS. 1 and 3, the oil cooling system 200 for example comprises: an oil inlet 210, a first annular oil application pipe 220, a second annular oil application pipe 230 and an axial oil application part 240.

The oil inlet 210 is configured to receive external cooling oil. For example, the oil inlet may receive cooling oil from a cooling oil pump via an oil entry pipeline.

Referring to FIG. 2, the first annular oil application pipe 220 is located at the first end part 121, and in fluid communication with the oil inlet 210. For example, the first annular oil application pipe may be connected to the oil inlet via a connecting pipeline disposed in a housing inner wall.

Continuing to refer to FIG. 2, the second annular oil application pipe 230 is located at the second end part 122, and in fluid communication with the oil inlet 210. For example, the second annular oil application pipe may be connected to the oil inlet via a connecting pipeline disposed in a housing inner wall.

It should be understood that "oil application pipe" means a pipeline used to apply cooling oil, and the "annular oil application pipe" means that the pipeline has a substantially annular shape. For example, the annular oil application pipe may be a circularly annular pipeline, or may be a semicircular pipeline, or a pipeline forming one quarter of a circular ring. It should be understood that embodiments of the present disclosure are not restricted in terms of the specific annular form of the annular oil application pipe.

It should be understood that the first and second annular oil application pipes may realize a process of applying oil to the electric machine stator via oil application holes disposed on the oil application pipes for example (the spraying of cooling oil from oil application holes towards the axial oil application part is shown schematically by the arrows in FIG. 3), thereby realizing direct cooling of the first end part and second end part of the electric machine stator, in particular the wire bundles disposed on the first end part and the second end part.

It should be understood that the terms "first annular oil application pipe" and "second annular oil application pipe"

are merely intended to distinguish between the two annular oil application pipes disposed at the first end part and the second end part respectively, rather than define them.

Figure 4:
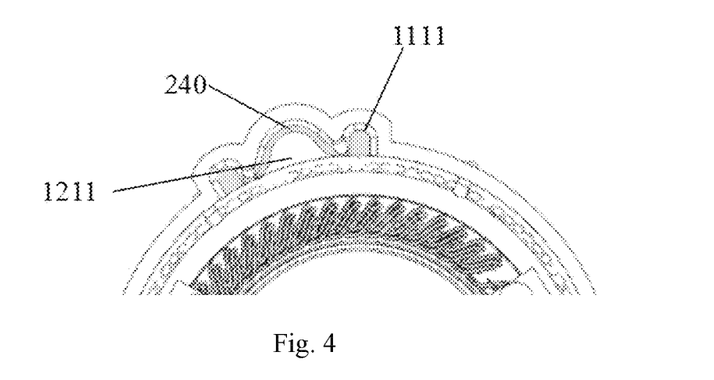
FIG. 4 shows a partial side view of the electric machine 100 according to embodiments of the present disclosure, wherein the axial oil application part 240 is shown schematically by the grey-shaded part.
Figure 6A:
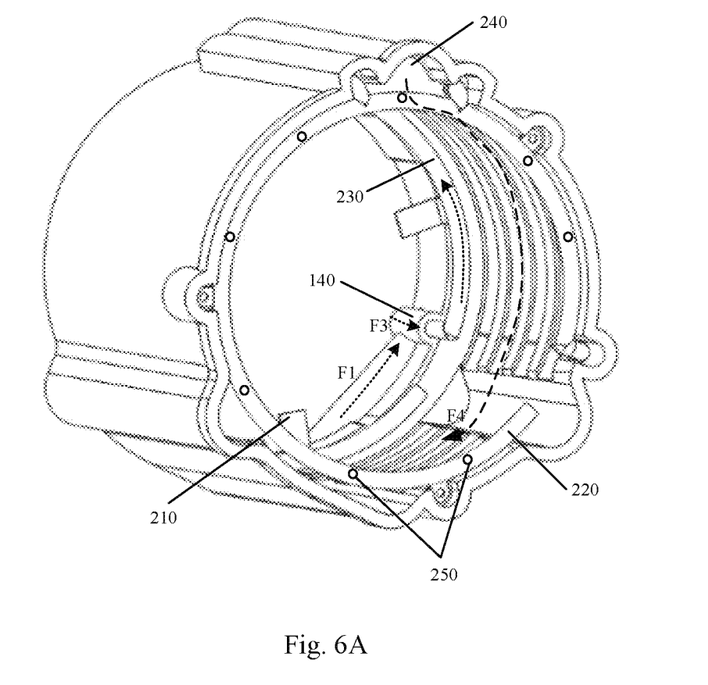
FIG. 6A shows a schematic drawing of the housing, the first annular oil application pipe 220 and the second annular oil application pipe 230, in a first direction.
Figure 7A:
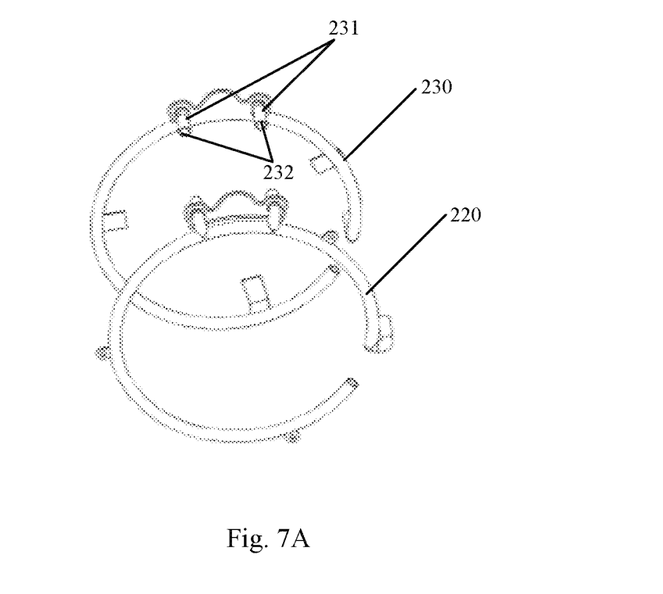
FIG. 7A shows a schematic drawing of axially extending sections 231 and openings according to embodiments of the present disclosure.
Figure 7B:
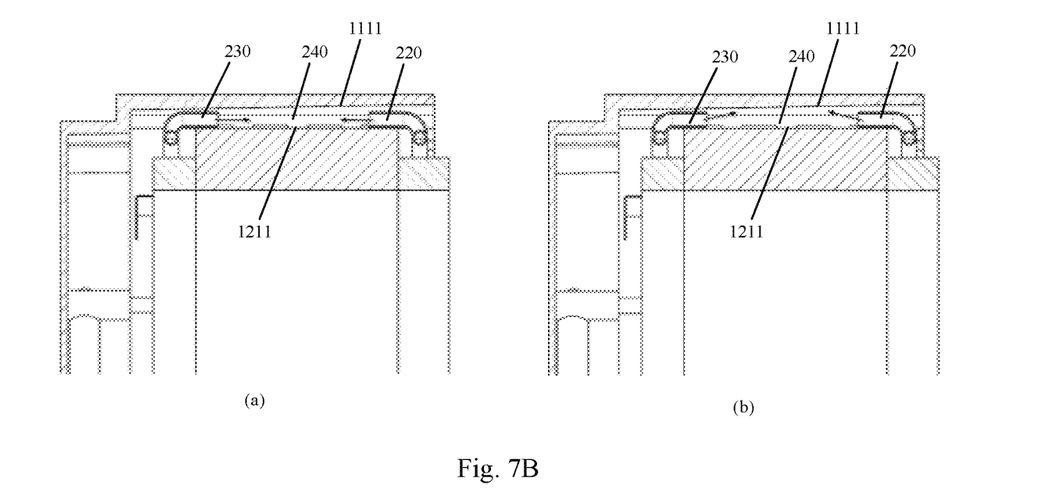
FIG. 7B shows examples of openings for spraying oil towards the axial oil application part 240 according to embodiments of the present disclosure.

FIG. 4 shows a partial side view of the electric machine 100 according to embodiments of the present disclosure, wherein the axial oil application part 240 is shown schematically by the grey-shaded part (the axial oil application part 240 is also labelled in FIGS. 6A and 7B below). Referring to FIGS. 3, 4, 6A and 7B together, the axial oil application part 240 is located between the first end part 121 and the second end part 122, and formed by a housing inner wall 1111 and a stator outer wall 1211; the axial oil application part 240 receives cooling oil from at least one of the first annular oil application pipe 220 and the second annular oil application pipe 230.

The axial oil application part is used to apply cooling oil to an axial segment of the electric machine, for example, to an axial segment 123 of the stator located between the first end part and second end part (this axial segment is shown schematically in FIG. 2).

The axial oil application part may for example receive cooling from only one of the first annular oil application pipe and second annular oil application pipe, or may receive cooling oil from both the first annular oil application pipe and the second annular oil application pipe at the same time.

For example, the axial oil application part may for example be an oil application section formed by the housing inner wall and stator outer wall together; the first annular oil application pipe and second annular oil application pipe for example each have an axially extending section that extends to the axial oil application part, and are each provided with an opening on the axially extending section; and the cooling oil flows into the axial oil application section via the opening on the axially extending section.

The process of the axial oil application part cooling the electric machine stator is now described in more detail. For example, referring to FIG. 3, after the cooling oil enters the axial oil application part via the first annular oil application pipe and/or the second annular oil application pipe (once the electric machine is mounted in place, the axial oil application part is for example disposed at the highest point of the electric machine or in a region close to the highest point), the cooling oil in the axial oil application part may for example flow from the axial oil application part to the bottom of the electric machine housing under its own weight directly via a gap formed by a circumferential inner wall of the housing and a circumferential outer wall of the electric machine stator, and in the process of flowing, cools the outer wall of the electric machine stator, i.e. cools the electric machine stator (in particular, the axial segment of the electric machine stator).

Alternatively, in some embodiments, a cooling channel may also be formed between the housing inner wall and the stator outer wall; the cooling channel is in fluid communication with the axial oil application part, and cooling oil cools the electric machine stator via the cooling channel. It should be understood that depending on actual needs, the oil cooling system may also comprise other components. For example, the oil cooling system may comprise a cooling oil pump, to supply cooling oil and receive used cooling oil. Moreover, the oil cooling system for example may further comprise a heat exchanger, disposed between the cooling oil pump and the oil inlet to cool the cooling oil entering the oil inlet.

Based on the above, in the present application, by configuring the oil cooling system to comprise the first annular oil application pipe disposed at the first end part of the stator and the second annular oil application pipe disposed at the second end part of the stator, direct cooling of the stator wire bundles via the annular oil application pipes disposed at the two end parts is enabled; furthermore, by providing the axial oil application part for receiving cooling oil from at least one of the first annular oil application pipe and the second annular oil application pipe, effective cooling of the electric machine stator and in particular the axial segment of the electric machine stator via the annular oil application parts is enabled. Thus, in the process of stator cooling, it is possible to effectively cool both the axial segment of the stator and the wire bundles at the end parts; compared with a cooling system of straight pipes laid abreast, direct cooling of the stator wire bundles can also be achieved, thus improving the wire bundle cooling result, and helping to prevent overheating of the wire bundles which would affect the performance of the electric machine stator; moreover, there is no need for additional straight pipes laid abreast, so costs are effectively reduced.

Figure 5A:
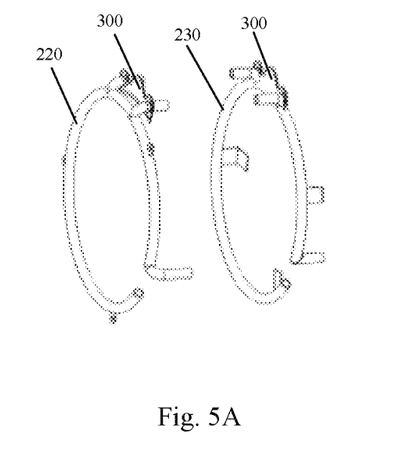
FIG. 5A shows a schematic drawing of a first annular oil application pipe 220 and a second annular oil application pipe 230 according to embodiments of the present disclosure.
Figure 5B:
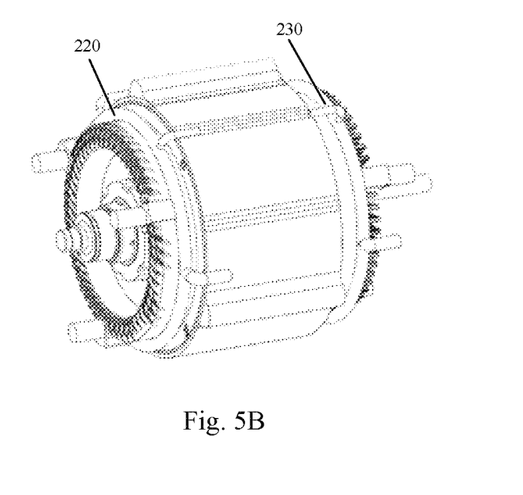
FIG. 5B shows a schematic drawing of the first annular oil application pipe 220 and the second annular oil application pipe 230 according to embodiments of the present disclosure, when fitted to the electric machine stator.

FIG. 5A shows a schematic drawing of the first annular oil application pipe and the second annular oil application pipe according to embodiments of the present disclosure. FIG. 5B shows a schematic drawing of the first annular oil application pipe and the second annular oil application pipe according to embodiments of the present disclosure, when fitted to the electric machine stator.

Referring to FIGS. 5A and 5B, in some embodiments, the first annular oil application pipe 220 and the second annular oil application pipe 230 are separate components.

It should be understood that the statement that the first annular oil application pipe and the second annular oil application pipe are separate means that no axial connecting pipe for directly connecting the first annular oil application pipe and the second annular oil application pipe is provided therebetween.

Based on the above, in the present application, as a result of configuring the first annular oil application pipe and second annular oil application pipe to be separate, compared with an existing oil cooling system comprising two annular cooling pipes and an axial connecting pipe arranged axially between the two annular cooling pipes to connect the two annular cooling pipes, the structural layout of two separate annular oil application pipes used in the present application enables the oil cooling system in the present application to be mounted to the electric machine in a simple and convenient way; moreover, without any axial connecting pipe provided for connection purposes, when the axial size of the electric machine changes, the first annular oil application pipe and second annular oil application pipe in the oil cooling system of the present application can still be flexibly mounted to the two end parts of the electric machine, thus making it easier for the oil cooling system to be adapted to electric machines with different axial length dimensions.

Figure 6B:
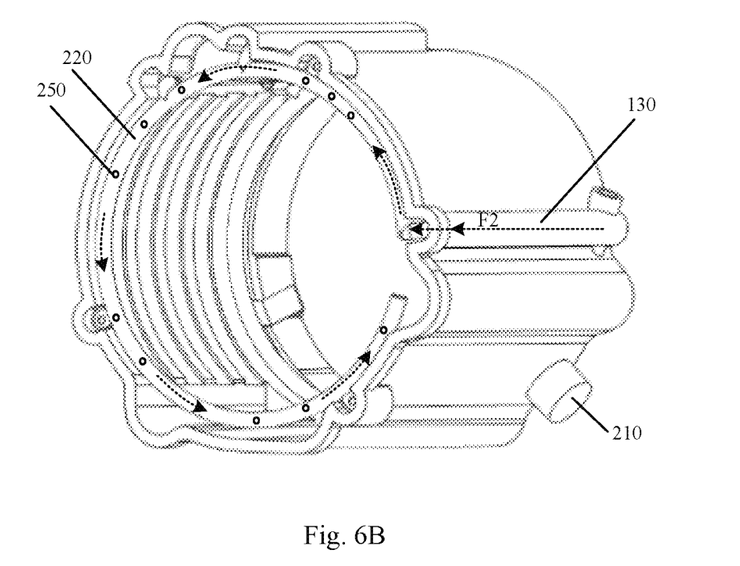
FIG. 6B shows a schematic drawing of the housing, the first annular oil application pipe 220 and the second annular oil application pipe 230, in a second direction.

FIG. 6A shows a schematic drawing of the housing and the first and second annular oil application pipes, in a first direction. FIG. 6B shows a schematic drawing of the housing and the first and second annular oil application pipes, in a second direction.

Referring to FIG. 6B, in some embodiments, the first annular oil application pipe 220 is in fluid communication with the oil inlet 210 via a first connecting pipeline 130 formed by the housing inner wall; and referring to FIG. 6A, the second annular oil application pipe 230 is in fluid communication with the oil inlet 210 via a second connecting pipeline 140 formed by the housing inner wall.

It should be understood that the terms "first connecting pipeline 130" and "second connecting pipeline 140" are merely used to distinguish between pipelines formed by the housing inner wall and used to connect different oil application pipes, rather than define these pipelines.

The connecting pipelines are now described in further detail with reference to FIGS. 6A and 6B. Firstly, cooling oil flowing in from the oil inlet 210 flows into the housing inner wall via a path F1 for example (the path F1 is for example an input pipeline formed by the housing inner wall); next, after flowing along the path F1, the cooling oil is split into two branches: one portion of cooling oil will enter a path F2 via the first connecting pipeline 130 (which in this case is for example the transverse connecting pipeline shown schematically in FIG. 6B) disposed at the housing inner wall, flow into the first annular oil application pipe 220 via the first connecting pipeline 130, and flow in the first annular oil application pipe 220, to provide cooling oil to the first end part of the electric machine via the corresponding oil application holes 250; another portion of cooling oil will enter a path F3 via the second connecting pipeline 140 (which in this case is for example the transverse connecting pipeline shown schematically in FIG. 6A) disposed in the housing inner wall, enter the second annular oil application pipe 230 via the second connecting pipeline 140, and flow in the second annular oil application pipe 230, to provide cooling oil to the second end part of the electric machine via the corresponding oil application holes 250.

It should be understood that the present application is not restricted in terms of the specific shapes and dimensions of the first connecting pipeline and second connecting pipeline formed inside the housing.

Based on the above, in the present application, as a result of configuring the first annular oil application pipe to be in fluid communication with the oil inlet via the first connecting pipeline formed by the housing inner wall, and configuring the second annular oil application pipe to be in fluid communication with the oil inlet via the second connecting pipeline formed by the housing inner wall, the connecting pipelines of the housing inner wall can be effectively used for the additional purpose of separately connecting the first annular oil application pipe and second annular oil application pipe to the oil inlet, so that there is no need to additionally provide an axial connecting pipe for connecting the first and second annular oil application pipes; thus, based on the effective connection of both the first and second annular oil application pipes to the oil inlet to receive cooling oil, the oil cooling system of the present application is further enabled to be mounted to the electric machine in a simple and convenient way; and based on effective adaptation to electric machines of different axial sizes, the manufacturing cost of the oil cooling system can be further reduced by using the connecting pipelines of the housing inner wall for the additional purpose.

In some embodiments, the first annular oil application pipe and the second annular oil application pipe are both provided with oil application holes 250.

The oil application holes are parts that take the form of holes in the first and second oil application pipes and are used to apply cooling oil to the electric machine. It should be understood that the oil application holes may for example be round holes, or may have another shape. Embodiments of the present disclosure are not restricted in terms of the specific shape and size of the oil application holes.

The oil application holes may for example be uniformly distributed on the first annular oil application pipe and the second annular oil application pipe, or the positions and manner of arrangement of the oil application holes on the first annular oil application pipe and the second annular oil application pipe may be configured flexibly according to actual circumstances (e.g. based on heating at different sections of the two end parts of the electric machine stator). It should be understood that embodiments of the present disclosure are not restricted in terms of the positions and manner of arrangement of the oil application holes on the first and second annular oil application pipes.

In some embodiments, the oil application holes 250 apply cooling oil to stator wire bundles at the first end part and the second end part.

For example, as stated above, the electric machine stator has stator wire bundles at the first end part and the second end part. It should be understood that the stator wire bundles are formed of stator windings wound on the electric machine stator.

For example, the oil application holes may be configured to be located at the side of the first and second annular oil application pipes that faces towards the electric machine stator, and the cooling oil in the first and second annular oil application pipes may be configured to be sprayed radially towards the electric machine stator through the oil application holes, thereby directly cooling the first end part and second end part of the electric machine stator, in particular the stator wire bundles at the first end part and second end part of the electric machine stator.

Based on the above, as a result of configuring the oil application holes to apply cooling oil to the stator wire bundles at the first end part and the second end part, direct cooling of the stator wire bundles at the first end part and second end part of the electric machine stator via the oil application holes on the first and second annular oil application pipes is enabled. Compared with an existing oil cooling system that can only cool an axial segment of the stator and is unable to directly cool stator wire bundles, the oil cooling system of the present application can cool both the axial segment of the stator and the stator wire bundles, thereby improving the cooling result, and in particular reducing the impact which excessively high wire bundle temperature has on electric machine performance.

In some embodiments, at least one of the first annular oil application pipe 220 and the second annular oil application pipe 230 has an opening for spraying oil towards the axial oil application part.

The opening for spraying oil towards the axial oil application part is an opening for causing cooling oil to flow into the axial oil application part from at least one of the first annular oil application pipe and the second annular oil application pipe. Embodiments of the present disclosure are not restricted in terms of the specific position and design of the opening.

For example, the opening may be provided on only one of the first annular oil application pipe and the second annular oil application pipe, so that cooling oil in only one of the first annular oil application pipe and the second annular oil application pipe flows into the axial oil application part, or openings for spraying oil towards the axial oil application part may be provided on both the first annular oil application pipe and the second annular oil application pipe.

For example, an oil application hole disposed at a position leading to the axial oil application part may be used directly as the abovementioned opening for spraying oil towards the axial oil application part; or at least one axially extending section may be provided on at least one of the first annular oil application pipe and the second annular oil application pipe, and the opening leading to the axial oil application part may be provided on the axially extending section.

Based on the above, in the present application, as a result of configuring at least one of the first annular oil application pipe and the second annular oil application pipe to have an opening for spraying oil towards the axial oil application part, cooling oil in the first annular oil application pipe and/or the second annular oil application pipe can pass into the axial oil application part via the opening, thus facilitating fluid communication between the axial oil application part and the first and/or second annular oil application pipe, so as to effectively supply cooling oil to the axial oil application part, and thereby cool the electric machine stator with the cooling oil at the axial oil application part.

In some embodiments, at least one of the first annular oil application pipe and the second annular oil application pipe has at least one axially extending section, and the opening is provided on the axially extending section.

The axially extending section is a section of the first annular oil application pipe and/or the second annular oil application pipe that extends towards the axial oil application part, for example in the axial direction of the electric machine.

The opening may for example be disposed at an end part of the axially extending section, or may be disposed at another position on the axially extending section according to actual needs.

For example, one axially extending section may be provided on each of the first annular oil application pipe and the second annular oil application pipe, or depending on actual needs, two axially extending sections may be provided on each of the first annular oil application pipe and the second annular oil application pipe. For example, FIG. 7A shows a schematic drawing of axially extending sections and openings according to embodiments of the present disclosure. Referring to FIGS. 7A, this shows the first annular oil application pipe 220 and the second annular oil application pipe 230. Moreover, two axially extending sections 231 are for example provided on the second annular oil application pipe 230, and an opening 232 is correspondingly provided at an end part of each axially extending section. Moreover, the first annular oil application pipe in FIG. 7A is also correspondingly provided with two axially extending sections and openings; details are not repeated here. However, it should be understood that embodiments of the present disclosure are not restricted in terms of the number of axially extending sections provided on the first annular oil application pipe and the second annular oil application pipe.

For example, FIG. 7B shows examples of openings for spraying oil towards the axial oil application part 240 according to embodiments of the present disclosure; referring to FIG. 7B, the directions of the openings may for example be horizontal opening directions extending substantially in the axial direction (as shown in FIG. (a) at the left side in FIG. 7B); or depending on actual circumstances, the directions of the openings (i.e. the directions of the axially extending sections) may be configured to be oblique directions at a certain angle of inclination (e.g. an angle of inclination of 30 degrees, 45 degrees or 60 degrees) with respect to the axial direction (as shown in FIG. (b) at the right side in FIG. 7B). Using oblique directions may for example have an additional advantage: the oil sprayed on the housing or stator surface can have its flow speed reduced, so as not to leak out of the axial oil application part easily; in addition, cooling oil is passed into the axial oil application part more accurately and reliably by choosing a suitable angle of inclination, thereby preventing cooling oil from flowing out of the electric machine stator in an undesired direction (e.g. flowing out of the electric machine stator axially towards the outside of the electric machine stator through an axial gap of the electric machine stator, i.e. in a direction away from the axial oil application part), and thereby achieving the objective of preventing oil leakage.

Figure 7C:
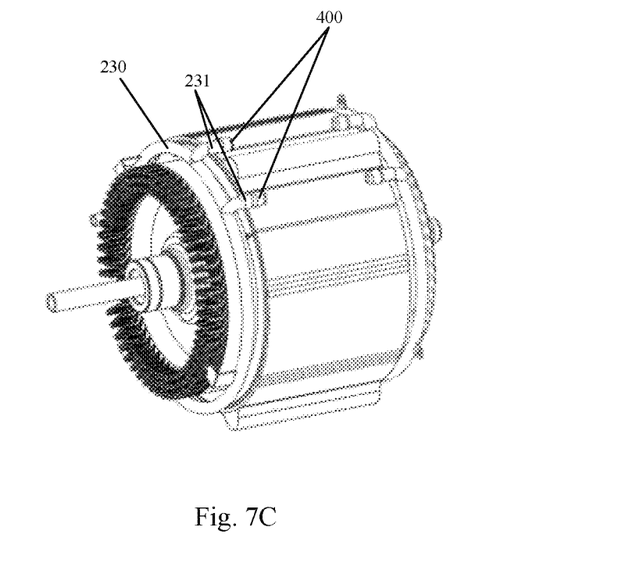
FIG. 7C shows a schematic drawing of axially extending sections 231 with oil stop plugs 400 according to embodiments of the present disclosure.

FIG. 7C shows a schematic drawing of axially extending sections 231 with oil stop plugs 400 according to embodiments of the present disclosure. Referring to FIG. 7C, for example, taking the second annular oil application pipe 230 as an example, the oil stop plug 400 may be further fitted over the opening of the axially extending section 231 thereof; the oil stop plug 400 may for example be an oil stop plug of rubber material, the oil stop plug for example having the shape of a tapered columnar object, one end of the oil stop plug having a first opening corresponding to the axially extending section, so as to be fitted over the axially extending section, and the other end having a second opening smaller in size than the opening of the axially extending section. When the oil stop plug is fitted over the axially extending section, it may for example effectively further constrict the opening on the axially extending section, i.e. constrict the opening to the second opening with the smaller opening size. It is thus possible to guide the cooling oil to the axial oil application part more precisely and reliably, reducing undesirable overflow of cooling oil, and the oil stop plug 400 may also have the action of a sealing ring, thus further preventing oil leakage.

Based on the above, as a result of configuring at least one of the first annular oil application pipe and the second annular oil application pipe to have at least one axially extending section, with an opening for spraying oil towards the axial oil application part being provided on the axially extending section, the flow direction of cooling oil can be further guided via the axially extending section, so as to pass the cooling oil into the axial oil application part accurately and reliably, thereby directing the cooling oil towards the axial oil application part more effectively.

In some embodiments, at least one cooling channel is also formed between the housing inner wall and the stator outer wall, the at least one cooling channel being in fluid communication with the axial oil application part 240.

The cooling channel is a pathway for cooling oil flow. For example, the cooling channel may be a groove formed on the housing inner wall in the circumferential direction.

The statement that the cooling channel is in fluid communication with the axial oil application part means that cooling oil in the axial oil application part is able to flow into the cooling channel.

It should be understood that depending on actual needs, the cooling channel may for example be multiple cooling channels arranged uniformly between the housing inner wall and the stator outer wall; or may be one or more cooling channels disposed between one part of the housing inner wall and a corresponding part of the stator outer wall. Specifically, for example when the electric machine housing has a draft angle, a gap between the electric machine housing inner wall and the stator outer wall for example decreases from the first end part to the second end part, i.e. the gap between the electric machine housing and the stator outer wall is largest at the first end part of the electric machine stator, the gap between the electric machine housing and the stator outer wall is smallest at the second end part of the electric machine stator, and the cooling channel is for example a groove formed on the housing inner wall; in this case, for example, the cooling channel may be formed only at a part of the housing inner wall that is close to the second end part of the electric machine stator, so that cooling oil can flow effectively in a region where the gap between the electric machine stator outer wall and the electric machine housing inner wall is smaller (where cooling oil might not be able to flow effectively) due to the provision of the cooling channel, thereby cooling this region effectively.

Based on the above, in the present application, as a result of the configuration whereby at least one cooling channel is further formed between the housing inner wall and the stator outer wall, with the at least one cooling channel being in fluid communication with the axial oil application part, cooling oil in the axial oil application part can flow between the housing inner wall and the stator outer wall under the guidance of the cooling channel, such that guidance of the cooling oil is facilitated effectively, thereby enhancing the cooling result and efficiency, in particular enhancing the cooling result in a region where the housing inner wall and stator outer wall are joined or the gap therebetween is smaller (in such a region, cooling oil might not be able to flow effectively if no cooling channel were provided, giving a poor cooling result).

Figure 8:
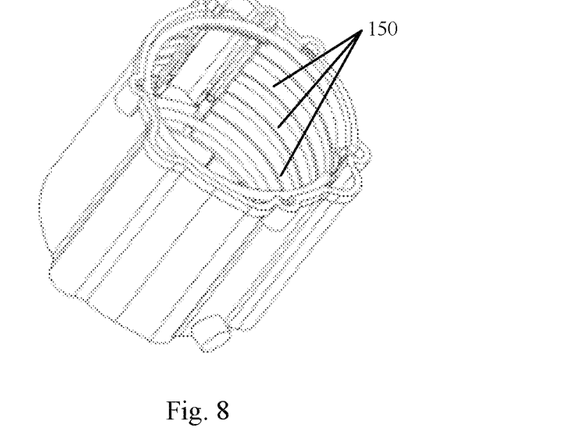
FIG. 8 shows a schematic drawing of cooling channels formed by the housing inner wall according to embodiments of the present disclosure.

FIG. 8 shows a schematic drawing of cooling channels formed by the housing inner wall according to embodiments of the present disclosure. Referring to FIG. 8, in some embodiments, the at least one cooling channel is grooves 150 formed on the housing inner wall in the circumferential direction.

The circumferential direction is the direction of the housing periphery. For example, when the housing has a substantially cylindrical shape, the circumferential direction is for example the peripheral direction of the circumference of the cylinder.

The groove may for example be a groove with a rectangular shape (as shown in FIG. 8), so as to accommodate cooling oil therein, and thereby guide cooling oil to flow along the surface of the axial segment of the electric machine stator; or may have another shape. It should be understood that embodiments of the present disclosure are not restricted in terms of the specific shape and dimensions of the groove.

For example, the groove on the housing may extend along the entire circumferential direction, or may extend over only part of the circumferential direction according to actual needs (for example, with no groove being provided at the bottom of the housing in the direction of gravity).

Based on the above, in the present application, as a result of configuring the at least one cooling channel to be a groove formed on the housing inner wall in the circumferential direction, the inner wall of the housing can be used for the additional purpose of simply and conveniently forming a cooling channel connected to the axial oil application part, helping to reduce costs.

In some embodiments, the axial oil application part 240 is disposed at an upper part of the at least one cooling channel in the direction of gravity.

The direction of gravity is the direction of the cooling oil's own weight, and the statement that the axial oil application part is disposed at an upper part of the at least one cooling channel in the direction of gravity means that the axial oil application part is disposed upstream of the cooling channel in the direction of the cooling oil's own weight, such that the cooling oil will flow towards the cooling channel from the axial oil application part under the action of its own weight, so no additional guidance is needed; refer to FIG. 6A, which shows with a dotted line a path F4 of cooling oil flowing into the cooling channel from the axial oil application part 240 under gravity and then flowing in the cooling channel. For example, as shown in FIG. 3, once the electric machine is mounted in place, the axial oil application part in the oil cooling system of the electric machine is for example disposed at the highest point of the electric machine or in a region close to the highest point.

Based on the above, as a result of having the axial oil application part disposed at an upper part of the at least one cooling channel in the direction of gravity, after cooling oil has passed into the axial oil application part, it will be able to effectively flow into the cooling channel via the axial oil application part under the action of its own weight; thus, the flow direction of the cooling oil is guided effectively, preventing cooling oil from flowing or overflowing in an undesired direction (e.g. flowing out of the first end part and second end part of the electric machine stator in the axial direction).

In some embodiments, the oil cooling system further comprises an oil collection groove for collecting cooling oil, the oil collection groove having an oil outlet.

The oil collection groove is a groove-like part for collecting cooling oil; the oil outlet is an opening for conveying cooling oil out of the oil collection groove. It should be understood that embodiments of the present disclosure are not restricted in terms of the specific shape and structure of the oil collection groove and oil outlet.

For example, the oil collection groove may be disposed at the bottom of the electric machine stator in the direction of gravity, such that having entered the cooling channel from the axial oil application part in the direction of gravity and been guided by the cooling channel, cooling oil can be collected by the oil collection groove to the maximum extent when it flows out of an extremity of the cooling channel and enters the bottom of the electric machine stator.

For example, the oil outlet may be connected to the cooling oil pump, such that the cooling oil collected by the oil collection groove flows back into the cooling oil pump.

Based on the above, as a result of configuring the oil cooling system to further comprise the oil collection groove and oil outlet, cooling oil can be recovered via the oil collection groove after the cooling oil has cooled the stator, and further outputted via the oil outlet; in this way, cooling oil can be outputted effectively, making it possible to recycle the cooling oil.

Figure 9A:
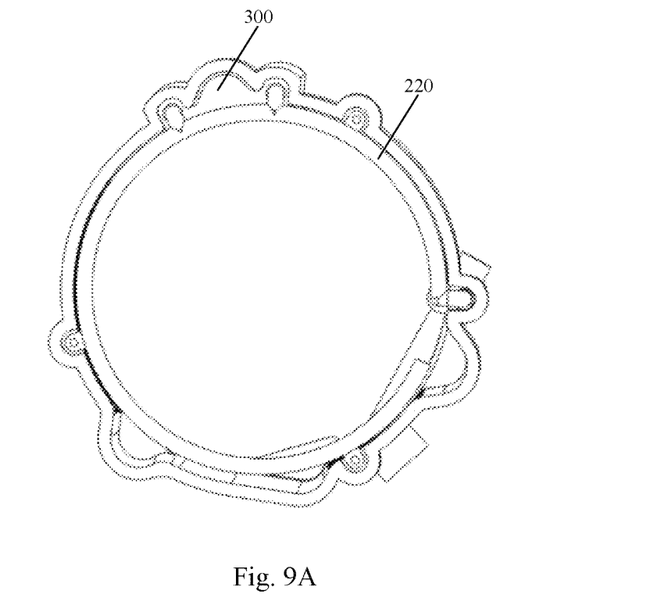
FIG. 9A shows a schematic drawing of an oil baffle 300 mounted to the electric machine 100 according to embodiments of the present disclosure.

FIG. 9A shows a schematic drawing of an oil baffle 300 mounted to an electric machine according to embodiments of the present disclosure.

Referring to FIG. 9A, in some embodiments, the oil baffle 300 is provided at least at the first end part.

The oil baffle 300 is a baffle structure for reducing overflow of cooling oil from inside the axial oil application part via an axial end part; it may for example be an "E"-shaped structure, so as to be mounted to the corresponding end part of the electric machine stator in an adapted manner, or may have another shape.

The oil baffle 300 may for example be provided at the first end part only, or the oil baffle 300 may be provided at both the first end part and the second end part, so as to reduce cooling oil leakage at both the first end part and the second end part.

Referring to FIG. 9A, in some embodiments, the first end part 220 is a non-drive end, the housing inner wall tapers at the axial oil application part 240 in the direction from the first end part 220 towards the second end part 230, and the oil baffle 300 is provided at least at the first end part 220.

The non-drive end is a non-power-output end of the electric machine. The statement that the housing inner wall tapers at the axial oil application part 240 in the direction from the first end part 220 towards the second end part 230 means that: at the axial oil application part 240, in the direction from the first end part towards the second end part, the spatial size of the axial oil application part gradually decreases.

The decrease may for example be explained in more detail: for example, the electric machine housing has a draft angle in the axial direction, such that the gap between the electric machine housing and the electric machine stator decreases in the direction from the first end part towards the second end part, i.e. such that the axial oil application part disposed between the first end part and the second end part and formed by the housing inner wall and the stator outer wall tapers in the direction from the first end part 220 towards the second end part 230.

The oil baffle 300 may for example be provided at the first end part only (at the first end part, the gap between the housing inner wall and the electric machine stator outer wall is largest, and consequently, cooling oil leaks most easily from the first end part in the axial direction), or the oil baffle 300 may be provided at both the first end part and the second end part, so as to reduce cooling oil leakage at both the first end part and the second end part.

It should be understood that, referring to FIG. 5A, when the first annular oil application pipe 220 and second annular oil application pipe 230 are provided with axially extending sections, the oil baffle 300 may for example have corresponding mounting holes, the oil baffle 300 being fitted over the axially extending sections of the first annular oil application pipe 220 and the second annular oil application pipe 230 via the mounting holes, and a peripheral edge of the oil baffle is for example joined to an electric machine casing, for example forming an interference fit with an inner surface of the electric machine casing; in this way, secure mounting and effective positioning of the oil baffle 300 in the electric machine is achieved.

Based on the above, in the present application, when the electric machine housing has a draft angle, i.e. when the housing inner wall tapers at the axial oil application part in the direction from the first end part towards the second end part, then as a result of configuring the axial oil application part to have an oil baffle at least at the first end part, it is possible by means of the oil baffle to effectively block cooling oil from overflowing in large amounts from the first end part where the gap between the housing inner wall and the electric machine stator outer wall is larger; guidance of cooling oil is thus achieved and axial oil leakage is prevented, such that cooling oil flows into the axial oil application part to the maximum extent, improving the electric machine stator cooling result.

It should be understood that although the method of configuring the oil baffle has been described above for the case where the housing inner wall tapers at the axial oil application part in the direction from the first end part towards the second end part, the configuration of the oil baffle is still applicable in the case where the electric machine housing has no draft angle (i.e. the housing inner wall has substantially the same spatial size at the axial oil application part in the direction from the first end part towards the second end part), in which case, it is still possible to provide an oil baffle as described above at the first end part and/or the second end part; the specific process is as described above, and is not repeated here.

Figure 9B:
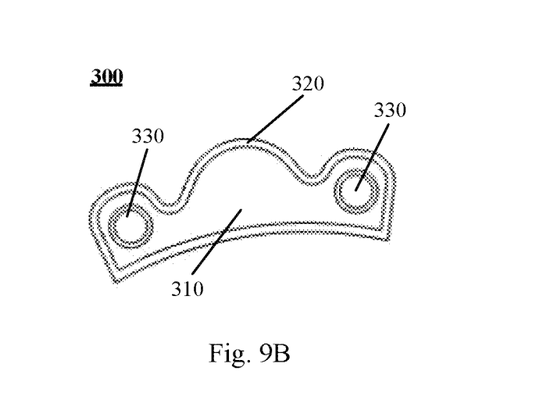
FIG. 9B shows a schematic drawing of the oil baffle 300 according to embodiments of the present disclosure.

FIG. 9B shows a schematic drawing of an oil baffle 300 according to embodiments of the present disclosure. Referring to FIG. 9, in some embodiments, the oil baffle 300 comprises: a metal framework 310 and an elastic covering part 320.

The metal framework 310 is an oil baffle framework part formed of a metal material; depending on actual needs, the metal framework part may for example have an "E"-shape as shown in FIG. 9B, so as to adapt to the electric machine stator and housing structure. It should be understood that embodiments of the present disclosure are not restricted in terms of the specific material used for the metal framework.

The elastic covering part 320 is an elastic edge part used to cover the metal framework, and may for example be a rubber material, or may use a material with elastic properties depending on actual needs; embodiments of the present disclosure are not restricted with regard to the elastic covering part.

For example, mounting holes 330 may be further provided in the metal framework part, to facilitate mounting of the oil baffle onto the axially extending sections of the first annular oil application part and/or the second annular oil application part in the manner described in detail above; in this case, the elastic covering part for example further comprises elastic covering rings disposed at inner rings of the mounting holes, so as to achieve effective fitting of the mounting holes to the first annular oil application part and/or the second annular oil application part.

Based on the above, in the present application, as a result of configuring the oil baffle to comprise the metal framework and the elastic covering part, firstly, a main body part of the oil baffle is formed by means of the metal framework, such that the main body part can have relatively high rigidity, so as to effectively stop cooling oil and prevent the overflow of cooling oil; secondly, as a result of providing the elastic covering part located at the periphery of the metal framework, the oil baffle can be mounted to the electric machine housing effectively by means of the elastic properties of the elastic covering part, and in particular can be mounted securely and effectively when there are dimensional tolerances.

If the oil baffle 300 is provided, referring to FIGS. 5A, 7A and 9B together, when the first annular oil application pipe 220 and second annular oil application pipe 230 are provided with axially extending sections, corresponding mounting holes 330 may for example be provided in the metal framework 310 of the oil baffle 300, the oil baffle 300 being fitted over the axially extending sections of the first annular oil application pipe 220 and the second annular oil application pipe 230 via the mounting holes 330, and the elastic covering part disposed at the peripheral edge of the metal framework of the oil baffle may for example be joined to the electric machine casing, for example forming an interference fit with an inner wall of the electric machine casing; in this way, secure mounting and effective positioning of the oil baffle 300 in the electric machine is achieved.

In some embodiments, the first annular oil application pipe 220 and the second annular oil application pipe 230 may for example not be provided with axially extending sections; oil application holes of the first annular oil application pipe 220 and the second annular oil application pipe 230 that face towards the axial oil application part are used directly as the abovementioned openings for spraying oil towards the axial oil application part.

Figure 10:
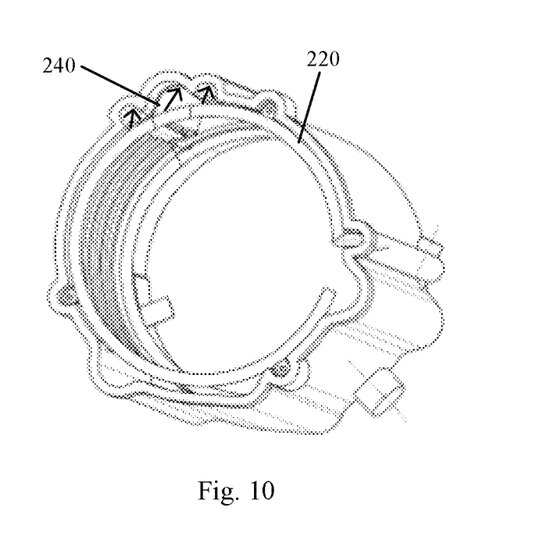
FIG. 10 shows a schematic drawing of an oil cooling system that is not provided with axially extending sections 231 according to embodiments of the present disclosure.

FIG. 10 shows a schematic drawing of an oil cooling system that is not provided with axially extending sections 231 according to embodiments of the present disclosure.

Referring to FIG. 10, in this case taking the first annular oil application pipe 220 as an example, multiple oil application holes may for example be provided at a position on the first annular oil application pipe 220 that faces towards the axial oil application part (the oil application holes are not shown in FIG. 10, but the spraying of cooling oil from the oil application holes towards the axial oil application part is shown schematically by arrows); by means of different positions and opening directions of the oil application holes, cooling oil in the first annular oil application pipe 220 may for example flow into the axial oil application part 240 in a direction angled at approximately 45 degrees. The second annular oil application pipe 230 may for example have a corresponding configuration, so unnecessary details are not given here.

Based on the above, as a result of providing oil application holes on the first annular oil application pipe and the second annular oil application pipe to serve as openings for spraying oil towards the axial oil application part, cooling oil from the first annular oil application pipe and the second annular oil application pipe can flow into the axial oil application part effectively when no axially extending sections are additionally provided. Moreover, with this configuration, since the oil application holes have already achieved effective and reliable guidance of cooling oil, and reduced the oil flow speed, the outflow of a large portion of cooling oil in the axial direction undesirably is avoided, so there is no need to additionally provide an oil baffle.

However, it should be understood that only one exemplary application is given above. Depending on actual circumstances, in the case where oil application holes of the first annular oil application pipe and the second annular oil application pipe that face towards the axial oil application part are used as the abovementioned openings for spraying oil towards the axial oil application part, it is possible to further provide an oil baffle at least one of the first end part and the second end part, so as to prevent overflow of cooling oil more effectively. That is to say, in this case the sealing requirements for the oil baffle are lower, i.e. the oil baffle does not need to completely seal a gap region between the stator and the housing.

Figure 11:
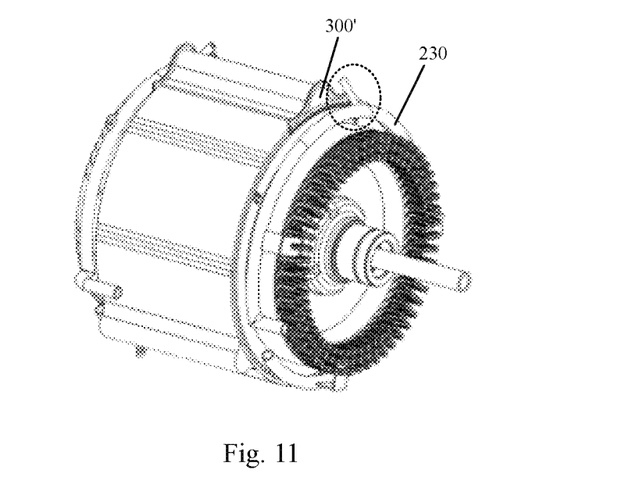
FIG. 11 shows a schematic drawing of cooperation between an oil baffle 300 and an oil application hole according to embodiments of the present disclosure.

FIG. 11 shows a schematic drawing of cooperation between an oil baffle and an oil application hole according to embodiments of the present disclosure. Referring to FIG. 11, in the case where an oil application hole capable of spraying oil towards the axial oil application part in an oblique direction (e.g. a direction at an angle of approximately 45 degrees to the axial direction) is provided on the second annular oil application pipe 230 so as to lead cooling oil into the axial oil application part 240 more effectively (for example, the part enclosed in the dotted circle shows schematically cooling oil being sprayed from the oil application hole towards the axial oil application part), the shape and dimensions of the oil baffle may for example be correspondingly adjusted; for example, the oil baffle 300' used here may roughly have the shape of an inverted "T", so that the cooling oil sprayed from the oil application hole towards the axial oil application part can flow into the axial oil application part without being stopped by the oil baffle.

According to another aspect of the present disclosure, an electric drive assembly system is proposed, which for example comprises the oil cooling system for an electric machine as described above.

The electric drive assembly system is a system used to realize drive control of a drive electric machine (e.g. a three-phase AC electric machine) of the vehicle. The electric drive assembly system for example may further comprise other electrical components or apparatuses, depending on actual needs. The embodiments of the present disclosure are not restricted by the specific composition of the electric drive assembly system or the types of components included therein.

In some embodiments, the oil cooling system for an electric machine in the electric drive assembly system may for example have the structure described above, and be able to perform the functions described above.

According to another aspect of the present disclosure, a vehicle is further proposed. The vehicle for example comprises the electric drive assembly system described above.

The vehicle is for example a pure electric vehicle (BEV, Battery Electric Vehicle), a hybrid vehicle (HEV, Hybrid Electric Vehicle), a plug-in hybrid vehicle (PHEV, Plug-in Hybrid Electric Vehicle), a range extended electric vehicle (range extended electric valve), a fuel cell vehicle (FCEV, Fuel Cell Electric Vehicle), etc.

In some embodiments, the electric drive assembly system of the vehicle may for example comprise an oil cooling system for an electric machine, and for example may have the structure described above, and be able to perform the functions described above.

In the present disclosure, specific terms are used to describe embodiments of the present disclosure. For example, "first/second embodiment", "an embodiment" and/or "some embodiments" refer to a feature, structure or characteristic relevant to at least one embodiment of the present disclosure. Therefore, it should be stressed and noted that "an embodiment", "one embodiment" or "an alternative embodiment" mentioned two or more times in different places herein does not necessarily refer to the same embodiment. In addition, certain features, structures or characteristics in one or more embodiments of the present disclosure may be combined appropriately.

Unless otherwise defined, all of the terms (including technical and scientific terms) used herein have the same meanings as those commonly understood by those skilled in the art. It should also be understood that terms such as those generally defined in a dictionary should be interpreted as having the same meanings as in the context of the related art, rather than being interpreted in an idealized or extremely formalized sense, unless expressly so defined herein.

The above is a description of the present disclosure and should not be regarded as limiting it. Although certain exemplary embodiments of the present disclosure have been described, those skilled in the art will readily understand that many modifications may be made to the exemplary embodiments without departing from the novel teaching and advantages of the present disclosure. Therefore, all such modifications are intended to be included within the scope of the present disclosure as defined by the claims. It should be understood that the above is a description of the present disclosure, and should not be deemed to be limited to the specific embodiments disclosed; in addition, modifications made to the disclosed embodiments and other embodiments are intended to be included within the scope of the attached claims. The present disclosure is defined by the claims and their equivalents.

The invention claimed is:

1. An oil cooling system for electric machine, the electric machine comprising a housing and a stator accommodated in the housing, the stator having a first end part and a second end part in an axial direction of the electric machine, the oil cooling system comprising:
   an oil inlet, for receiving external cooling oil;
   a first annular oil application pipe, located at the first end part and in fluid communication with the oil inlet;
   a second annular oil application pipe, located at the second end part and in fluid communication with the oil inlet;

an axial oil application part, located between the first end part and the second end part and formed by a housing inner wall and a stator outer wall, the axial oil application part receiving cooling oil from at least one of the first annular oil application pipe and the second annular oil application pipe, wherein the first annular oil application pipe is in fluid communication with the oil inlet via a first connecting pipeline formed by the housing inner wall, and the second annular oil application pipe is in fluid communication with the oil inlet via a second connecting pipeline formed by the housing inner wall.

2. The oil cooling system according to claim 1, wherein the first annular oil application pipe and the second annular oil application pipe are separate components.

3. The oil cooling system according to claim 1, wherein the first annular oil application pipe and the second annular oil application pipe are both provided with oil application holes.

4. The oil cooling system according to claim 3, wherein the oil application holes apply cooling oil to stator wire bundles at the first end part and the second end part.

5. The oil cooling system according to claim 1, wherein at least one of the first annular oil application pipe and the second annular oil application pipe has an opening for spraying oil towards the axial oil application part.

6. The oil cooling system according to claim 1, wherein at least one cooling channel is further formed between the housing inner wall and the stator outer wall, the at least one cooling channel being in fluid communication with the axial oil application part.

7. The oil cooling system according to claim 6, wherein the at least one cooling channel is a groove formed on the housing inner wall in a circumferential direction.

8. The oil cooling system according to claim 6, wherein the axial oil application part is disposed at an upper part of the at least one cooling channel in the direction of gravity.

9. The oil cooling system according to claim 1, wherein the oil cooling system further comprises an oil collection groove for collecting cooling oil, the oil collection groove having an oil outlet.

10. The oil cooling system according to claim 5, wherein at least one of the first annular oil application pipe and the second annular oil application pipe has at least one axially extending section, and the opening is provided on the axially extending section.

11. The oil cooling system according to claim 1, wherein an oil baffle is provided at least at the first end part.

12. The oil cooling system according to claim 11, wherein the oil baffle comprises:
a metal framework; and
an elastic covering part.

13. An electric drive assembly system comprising the oil cooling system for an electric machine according to claim 1.

14. A vehicle comprising the electric drive assembly system according to claim 13.

15. The oil cooling system according to claim 4, wherein at least one cooling channel is further formed between the housing inner wall and the stator outer wall, the at least one cooling channel being in fluid communication with the axial oil application part.

16. The oil cooling system according to claim 5, wherein an oil baffle is provided at least at the first end part.

17. An electric drive assembly system comprising the oil cooling system for an electric machine according to claim 2.

18. An electric drive assembly system comprising the oil cooling system for an electric machine according to claim 1.

19. An electric drive assembly system comprising the oil cooling system for an electric machine according to claim 3.

20. An oil cooling system for electric machine, the electric machine comprising a housing and a stator accommodated in the housing, the stator having a first end part and a second end part in an axial direction of the electric machine, the oil cooling system comprising:
an oil inlet, for receiving external cooling oil;
a first annular oil application pipe, located at the first end part and in fluid communication with the oil inlet;
a second annular oil application pipe, located at the second end part and in fluid communication with the oil inlet;
an axial oil application part, located between the first end part and the second end part and formed by a housing inner wall and a stator outer wall, the axial oil application part receiving cooling oil from at least one of the first annular oil application pipe and the second annular oil application pipe, wherein an oil baffle is provided at least at the first end part.

* * * * *